United States Patent
von Reventlow et al.

(10) Patent No.: US 12,422,842 B2
(45) Date of Patent: Sep. 23, 2025

(54) SERVICE ROBOT SYSTEM, ROBOT AND METHOD FOR OPERATING THE SERVICE ROBOT

(71) Applicant: Christian von Reventlow, Munich (DE)

(72) Inventors: Christian von Reventlow, Munich (DE); Thomas Krieger, Putzbrunn (DE); Jude Ng, Munich (DE)

(73) Assignee: Christian von Reventlow, Munich (DE)

( * ) Notice: Subject to any disclaimer, the term of this patent is extended or adjusted under 35 U.S.C. 154(b) by 100 days.

(21) Appl. No.: 17/921,983

(22) PCT Filed: Apr. 29, 2021

(86) PCT No.: PCT/EP2021/061317
§ 371 (c)(1),
(2) Date: Oct. 28, 2022

(87) PCT Pub. No.: WO2021/219812
PCT Pub. Date: Nov. 4, 2021

(65) Prior Publication Data
US 2023/0168670 A1    Jun. 1, 2023

(30) Foreign Application Priority Data

Apr. 29, 2020 (EP) ..................... 20172113

(51) Int. Cl.
*G05D 1/00* (2024.01)
*B25J 5/00* (2006.01)
(Continued)

(52) U.S. Cl.
CPC ............ *G05D 1/0016* (2013.01); *B25J 9/163* (2013.01); *B25J 11/008* (2013.01); *B25J 19/023* (2013.01);
(Continued)

(58) Field of Classification Search
CPC ........ B25J 9/163; B25J 11/008; B25J 19/023; B25J 5/007; B25J 13/00; G05D 1/0231;
(Continued)

(56) References Cited

U.S. PATENT DOCUMENTS

| 9,486,921 B1 | 11/2016 | Straszheim et al. |
| 2015/0120043 A1 | 4/2015 | Howard et al. |

(Continued)

FOREIGN PATENT DOCUMENTS

| DE | 102018106812 A1 * | 9/2019 | .............. B25J 13/06 |
| EP | 2363774 | 9/2011 | |

(Continued)

OTHER PUBLICATIONS

"Seamless Execution of Action Sequences"; F. Stulp et al., 2007 IEEE International Conference on Robotics and Automation Roma, Italy, Apr. 10-14, 2007 (Year: 2007).*

(Continued)

*Primary Examiner* — Ramsey Refai
*Assistant Examiner* — Tanya C Sienko
(74) *Attorney, Agent, or Firm* — JCIPRNET

(57) ABSTRACT

The invention regards a service robot system comprising a robot and a learning method for the system. The robot has a drive system and at least one effector. The system's processing unit determines a task to be executed by the robot and controls the drive system and the effector according to the task. The processing unit automatically retrieves action definition candidates from a database, evaluates the retrieved action definition candidates with respect to a success score indicating a likelihood that an action according to the action definition candidate contributes to successfully fulfilling the task, executes an action according to the action definition candidate having the highest probability equal to or above a predefined threshold, and sends a request (Continued)

Figure 1:
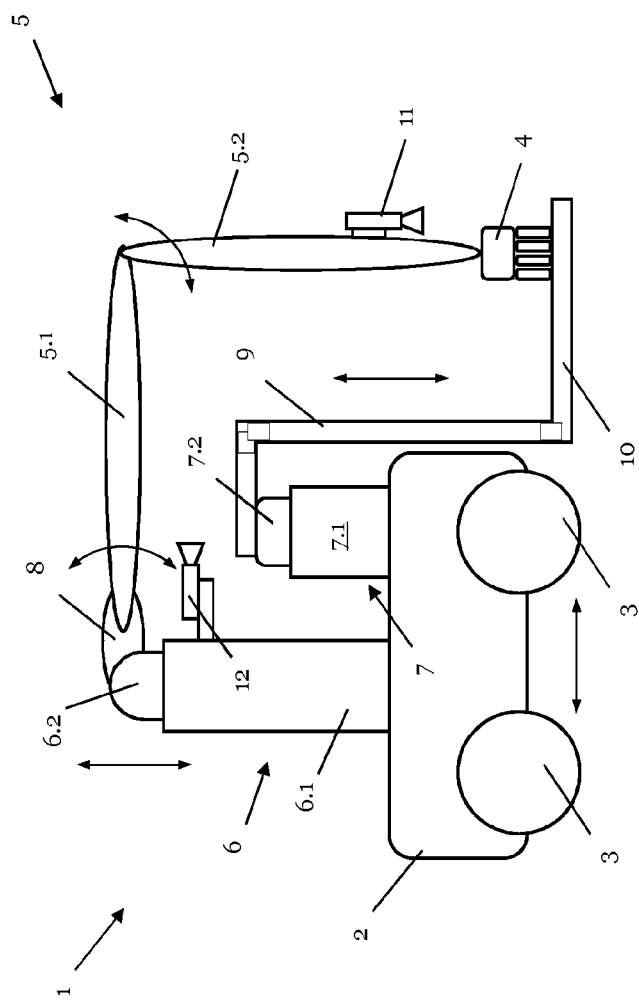

for assistance via a communication interface if the success score is less than a preset threshold. The system will learn from instructions and additional information received in response to such request.

23 Claims, 3 Drawing Sheets

(51) Int. Cl.
  *B25J 9/16* (2006.01)
  *B25J 11/00* (2006.01)
  *B25J 19/02* (2006.01)
(52) U.S. Cl.
  CPC .............. *G05D 1/0231* (2013.01); *B25J 5/007* (2013.01); *G05D 1/0257* (2013.01)
(58) Field of Classification Search
  CPC ... G05D 1/0016; G05D 1/0038; G05D 1/0221
  See application file for complete search history.

(56) References Cited

U.S. PATENT DOCUMENTS

| | | | |
|---|---|---|---|
| 2017/0021502 A1* | 1/2017 | Nusser | B25J 9/1687 |
| 2018/0272543 A1* | 9/2018 | Kayama | B25J 9/1687 |
| 2018/0370033 A1 | 12/2018 | Geffen et al. | |

FOREIGN PATENT DOCUMENTS

| | | | | |
|---|---|---|---|---|
| EP | 3620750 | 3/2020 | | |
| WO | 2015017691 | 2/2015 | | |
| WO | WO-2015017691 A1 * | 2/2015 | ............ | B25J 11/008 |
| WO | 2016014917 | 1/2016 | | |
| WO | WO-2016009423 A1 * | 1/2016 | ............... | B65G 1/04 |

OTHER PUBLICATIONS

Machine translation of DE 10201806812 A1 downloaded from IP.com Jul. 18, 2024 (Year: 2018).*
"DemoScenarioExp" by BionicHIVE Ltd. (3:00 minutes) off YouTube https://youtu.be/xqzlevWN9iM?si=WuisXFwJCifLMBVu Sep. 17, 2019 (Year: 2019).*
"Development of a Mixed Reality Based Interface for Human Robot Interaction" M. Cousins, Proc. of the 2017 Inter. Conf. on Machine Learning and Cybernetics, Ningbo, China, Jul. 9-12, 2017 (Year: 2017).*
"Baxter (robot)" entry on Wikipedia, downloaded from the Wayback Machine May 31, 2019 (Year: 2019).*
"International Search Report (Form PCT/ISA/210) of PCT/EP2021/061317", mailed on Oct. 4, 2021, with English translation thereof, pp. 1-5.
"Office Action of China Counterpart Application", with English translation thereof, issued on May 23, 2025, pp. 1-38.

* cited by examiner

SERVICE ROBOT SYSTEM, ROBOT AND METHOD FOR OPERATING THE SERVICE ROBOT

CROSS-REFERENCE TO RELATED APPLICATION

This application is a 371 of international application of PCT application serial no. PCT/EP2021/061317, filed on Apr. 29, 2021, which claims the priority benefit of European application no. 20172113.1, filed on Apr. 29, 2020. The entirety of each of the above mentioned patent applications is hereby incorporated by reference herein and made a part of this specification.

The present invention relates generally to service robot systems and the operation of such service robot.

Service robots providing services for their owners become increasingly popular. However, in most cases the advantages such a service robot has are very limited. One reason is a lack of flexibility in the service robot's operation. For example, it is easy to instruct a service robot how to mow a lawn within a well-defined outer borderline. Such autonomous lawnmowers randomly drive around on a lawn to be mowed until they reach a wire indicating the boundary of their working area or hit an obstacle. However, changes in the environmental situation usually overburden the capabilities of such an autonomous lawnmower. When the lawnmower encounters a situation that cannot be resolved by changing the traveling direction of the robot, the robot will stop its operation in order to remain in a safe state. This halt will last as long as the operator of the system, usually the garden owner, cleared the situation by reestablishing the environmental situation for which the autonomic lawnmower was set up. Although such a system is very helpful as long as no surprising situation for the autonomic lawnmower occurs, its efficiency in assisting its owner is rather limited because of its inherent lack of flexibility.

On the other hand, systems are known in which the user tele-operates a robot. Such a tele-operation of the robot is based on images that are captured by robot mounted cameras and that are transmitted to a remote control station where the captured images are reproduced using a display. Thus, the reproduced images present information on the currently encountered environment of the robot to its user/operator. Based thereon the operator can remotely control the robot. EP 2 363 774 A1 describe such a system with a particular focus on the problems caused by lag times when remotely controlling the robot. Although the solution proposed in EP 2 363 774 A1 may improve the result of a remote operation of the service robot, still, a user or operator is required to enable operation of the service robot all the time. This might be a solution when only a human shall be replaced in order to avoid the human entering hazardous or dangerous situations. Nevertheless, it does not alleviate the human from executing actions himself meaning that the human may not simultaneously get other things done.

Thus, there is a need to provide an improved service robot system which offers the capability of handling new situations during its regular operation and even learn for the future.

This task is achieved by the service robot system, service robot and method for operating the same as defined in the independent claims. Advantages aspects and further features are defined in the dependent claims.

The service robot system according to the present invention comprises a service robot and a processing unit including a task determination unit for determining a task to be executed by the robot. Thus, being in a position to determine a task to be executed, the operation of the robot is highly flexible. The robot is prepared to execute different tasks which are defined in the task determination unit. In the simplest embodiment the task determination unit is in communication with an interface for receiving an instruction from a user of the robot, for example, a spoken instruction, from which the information of the task to be executed is extracted. Alternatively, the task determination unit determines the task based on information sensed by the robot or received from other information sources like for example a clock or calendar for time information or information on events (calendar entries).

The robot is able to move using its drive system. The drive system can move the robot to target positions where at least one effector can execute at least a pick and place operation. The end effector can be any type of effector that allows the robot to manipulate the environment e.g. pick up items and hold them. The robot, including the drive system and end effector is controlled by the processing unit which may be included in the robot but may also be located at a remote position and be connected with the robot in order to transmit signals based on which control signals for the respective actuators of the drive system and the end effector can be generated.

The processing unit may consist of a single processor or comprise a plurality of processors which may be distributed over the system. Specifically, parts of the processing units may be arranged inside the robot while other parts are arranged at a distant location and in communication with the parts in the robot. According to the task to be executed the processing unit is configured to automatically retrieve action definition candidates from a database. The action definition candidates are definitions for actions that can be executed by the robot and that are estimated to be applicable in the current situation of the service robot. The action definition candidates are searched in the database based on objects that are identified in the environment of the robot. For identifying objects in the environment of the robot, the system comprises at least one sensor for physically sensing the environment of the robot. The sensor signal is then processed for identifying the objects. As an example, image processing of images captured by cameras as sensors is performed.

The retrieved action definition candidates are then evaluated and a success score is calculated. The success score is a measure how likely it is that an action according to an action definition candidate contributes to successfully fulfilling the task. The determination of the success score does not depend on a confidence for correctly identifying the current situation in which the robot shall act.

The individual success score for an action definition candidate may be calculated in consideration of actions corresponding to the respective action definition candidate having been performed in the past in comparable situations. Once the action definition candidates having the highest score are selected, the system distinguishes between situations where it can be assumed that an action corresponding to the selected action definition candidate will successfully contribute to fulfilling the task and situations where it cannot be assumed that the action corresponding to the selected action definition candidate will successfully contribute to fulfilling the task.

The success score of each selected action definition candidate is compared to a threshold. A selected action with a success score above the threshold is assumed to contribute to successfully executing the task. An action with a success score below or equal to the threshold is assumed not to contribute to successfully executing the task.

In case that the evaluation reveals that the success score is below or equal to the threshold, the controller will send a request for assistance via a communication interface. In case that the success score is estimated to lie above the preset threshold, the processing unit is configured to automatically generate signals in order to cause the service robot to execute the action corresponding to the selected action definition candidate.

In response to a request for assistance, the system will read in input received from an operator who is responsible for remotely controlling the robot and/or inputting information for teaching the robot. Later on, examples for such an input will be explained in more detail. The robot will execute an action then based on the input provided by the remote operator. According to a preferred embodiment, the action that is executed based on a remote controlled operation is evaluated regarding its potential to be advantageous for future tasks. In case it is judged that there is a likelihood that the specific action may be successfully applied to a future task, the corresponding action definition is stored in the database. If then, in the future, the processing unit searches for action definition candidates for a future task, the added action definition is available, too. If this action definition is then selected because it has the highest success score, this newly learned action may then be executed by the robot. Thus, any action definition which is generated from operator input in response to a request sent by the processing unit, because the current situation can not be handled without assistance from the operator, will increase the "knowledge base" of the service robot system, and the system consequently learns during its daily operation.

According to an advantageous implementation, the success score for each action definition candidate is determined based on information on a success of performing an action corresponding to the respective action definition candidate in the past. Thus, every time an action according to an action definition candidate is performed, the system stores the situation in which the action is performed and associated with the situation whether performing this action was successful or not. Based on the knowledge about the success of a specific action corresponding to an action definition candidate in situations in which this particular action was performed, the processing unit may then calculate the success score for an action definition candidate in the current situation. This success score is only based on history knowledge for the action definition candidates. The success score does not reflect whether the actual situation is determined correctly. Rather, the determination starts with the assumption that the current situation is determined correctly so that the currently experienced situation can be compared to similar situations experienced in the past. The similarity comparison then allows to calculate the success score for the current situation. The calculation may preferably take into consideration a measure for the similarity between the currently experienced situation and the situations that are stored.

An advantageous aspect is that the controller is configured to segment the determined task into a sequence of actions and their respective action definitions. The segmentation of the entire task into a sequence of actions is advantageous when the entire task is rather complex. Thus, the actions corresponding to the segments are rather primitive and, as a consequence, it is easier to predict whether execution of a single action will be successful. As an example the task "put the book back in the shelf" can be segmented into: 1. Move the robot to the table, 2. Move arm to grasping position, 3. Close gripper to pick up the book, 4. Place book on the tray, 5. Move robot to the shelf, 6. Pick up book from the tray, 7. Move arm to release position, and 8. Open gripper to place the book in the shelf. It is to be noted that segmenting a task to be executed may also lead to a higher number of actions but also small number of actions compared to the number of actions resulting from the segmentation in the above given example.

It is to be noted that one preferred "manipulation of the environment of the robot" is a pick and place operation, which will be used for further explanation hereinafter. However, this does not limit the invention. For such pick and place operations, the robot has a gripper, and potentially one or more assisting tools. Suction devices or spreaders could be used as tools. In a preferred embodiment, these tools and/or the end effector can be exchanged so that an adaptation to the task can be performed.

Further, it is preferred that the system is configured to start execution of an action only if for the action definition the probability that completion of the action is possible without interruption lies above a predefined threshold. It is to be noted that there will be dynamic objects in the environment that might change position (i.e. a moving dog) or that might change state (i.e. a person fills a cup with water) which enforces a new constraint on the environment. According to a preferred embodiment, the processing unit is configured to dynamically predict potential changes of the environment and to adapt the actions, or select actions while still maintaining the final safe target state. In particular, in case that a sequence of actions is necessary in order to complete the task, this approach ensures that the robot is always in a safe state, once a single action has been completed. The definition of the actions always defines such a safe state at its end. As a consequence, the robot will always be in a state where it is capable of receiving and executing a remote controlled instruction. The signal that is transmitted from the processing unit to the robot in case that the processing unit is remote from the robot always includes any information that is necessary to cause the robot to bring the action corresponding to the transmitted information to its end. Even in case that the connection between the robot and the processing unit is interrupted, the robot has enough information to come to a safe state. It is to be noted that in any case the robot itself has a processing capability that allows the robots to use the signal transmitted from the processing unit to generate control signals for driving the drive system and/or the effector.

It is further preferred that the robot is equipped with at least one sensor for physically sensing the robot's environment and further comprises an interface for transmitting the sensor output to the processing unit and/or the operator interface. Transmitting the sensor signal to the processing unit enables the controller to analyze the current situation in which the robot is. Further transmitting the sensor output to the operator interface enables the operator to analyze the situation of the robot. In both cases the sensor signal is the basis for deciding on the next operation of the robot. It is particularly preferred that the sensor includes a camera or, even more preferred, a plurality of cameras.

Although the operator's interface for being provided with information from the current situation in which the robot needs to be controlled may be a display displaying images captured by the sensors mounted on the robot (or even images captured by sensors that are stationary, for example, surveillance cameras in a house), according to an advantageous implementation, the operator interface comprises an extended reality (XR) set, for example, for virtually controlling the robot to execute an operation even before the remote control signals are transmitted to the robot for executing the same operation in the real world. In such an embodiment the entire action may be virtually executed by the operator before respective information is transmitted to the robots and control signals are generated by the robot. This bears the great advantage that the remotely controlled operation of the robot does not suffer from lag times which regularly results in an overshoot of a motion executed by the robot. In other situations, augmented reality may be used instead of virtual reality. An exemplary situation may be assisting a doctor/nurse, who is in the same room as the robot and in that case teaches the robot as an operator.

It is to be noted that an "action definition" is a general definition of any kind of motion that is executed by the robot or a part of it. Thus, an action definition may define a movement of the effector, any kind of additional tool of the robot and/or its drive system. The action definition allows the robot to adjust the execution of the action, for example, a distance to be travelled in case the drive system is controlled based on an action definition thereby defining the final trajectory. The adjustment is situation dependent and performed having knowledge of the environmental situation of the robot. For detailing an action before finally generating control signals after an action definition candidate is retrieved from the database and selected for execution, the processing unit calculates how the action is to be executed based on information extracted from the sensed environment in order to calculate the final trajectory of the robot and/or its effector. As an example, the motion of the effector (arm with a gripper/hand attached at its distal end) depends on the height of the object to be picked up. Based on images captured from the surroundings of the service robot the processing unit is able to calculate the correct position of the object and adjusts the movement parameters in the action definition accordingly. It is to be noted that the term "image" in the present context does not only refer to an image as captured by a camera generating a 2D-image but shall also cover information derived from any type of sensors that allows to generate a representation of the environment. Examples for such sensors are RADAR and LIDAR generating 3D-point cloud.

According to a preferred embodiment of the service robot, the robot comprises in addition to the at least one effector at least one support structure, with the at least one effector and the support structure being mounted to at least one lifter. Although in a simple embodiment the support structure and the effector may be mounted to the same lifter, it is preferred that the elevation of the support structure and the end effector can be adjusted individually. In that case two lifters are mounted on the moving platform of the robot (robot base). Providing such a support structure reduces the distances that need to be covered by the effector. Using the support structure it is possible to collect a plurality of items, place them on the support structure which may be a basket, a box, a tablet or pallet or the like, or even a forklift carrying an accommodation box or platform. This can be done with the support structure being lowered, for example, in case that a plurality of items shall be collected from the floor, and when these items have to be put into a shelf at a higher position, the support structure as well as the effector may be commonly elevated before putting the items back into the shelf. Thus, the support structure allows to significantly reduce the movements that are necessary for the service robot. Obviously, the same is true also in case that the starting position and the destination or target position are on the same height but the service robot would need to move back and forth if every item would be transported individually.

In order to allow the operator or the processing unit to get a detailed and exact understanding of the situation in which the robot is currently operated, a camera or other sensor allowing to image the environment of the robot is attached to the effector that is used for fulfilling the task. Thus, by moving the end effector or, in a more sophisticated embodiment, the camera (sensor) relative to the effector to which it is attached, the perspective of the captured image can be optimized. The service robot carries at least one additional camera (sensor) mounted at a different position on the robot and/or having a different zoom factor in order to provide an overview in addition to the detail of the scene.

Alternatively it would be possible to move the camera being attached to the effector, thereby capturing a plurality of images from different positions providing a detailed view and an overview. Obviously, this slows down the entire operation since movements of the effector would be necessary in order to obtain enough information on the situation allowing secure operation of the robot.

In addition to requesting remote controlled operation leaving it open how the operator responses, it is also preferred that the request includes at least one action definition candidate retrieved from the database. This is particularly useful in case that there are one or more action definition candidates that are estimated to potentially contribute to execution of the entire task but which do not have a success score that clearly indicates that the corresponding action may be executed successfully. In such a case the action definition candidates resulting in a success score below the preset threshold could be included in the request and provided as a suggestion to the operator. The operator then selects one of the suggested action definition candidates and the robot will proceed with execution of the action as instructed by the operator. In such a case it is not necessary for the operator to control the entire action, since execution of an action once defined is possible by the robot autonomously. Alternatively, in case that the plurality of action definition candidates receive the success score lying above the threshold, but the success scores do not differ significantly so that one favorite could be identified, these candidates can be included in a request so that the final decision lies with the operator.

As said above, the evaluation of action definition candidates includes a comparison of the success score calculated for the respective action definition candidate with a preset threshold. As an example, a book that lies on the table shall be put back into the shelf. In the beginning, the system needs to recognize and identify the book lying on the table. Thus, the system will first calculate a probability that the table is identified correctly and also a probability that the object to be grabbed is a book.

From the certainty of correct identification of the involved objects then a success score that the action involving the subjects may be successfully executed can be calculated.

This success score is then compared with the preset threshold that may be calculated from one or more tags that are stored associated with an object that is involved in the action to be executed. In above-mentioned example the object is the book. "Tags" are pieces of information that are associated with an object that is determined from the sensor signals. In case that the sensor includes a camera, image processing is carried out identifying an object, for example, a cup on the table. This cup may be made of different materials like metal or china and consequently handling the cup may require different levels of care. Thus, if the cup that is recognized from the captured image is identified to be made of china, the threshold may be set higher than for a cup that is made from metal. Obviously, the plurality of tags in different categories may be associated with objects that can be identified by the system. These tags may be added by the operator in case that the operator is invoked by the request and when the operator identifies objects or their characteristics in response. Inputting additional information associated with an identified object and storing it will result in an improved database.

It is to be noted that the request sent by the controller may result in either remotely controlling the way an action is executed by the service robot but also in adding information on objects recognized in the environment of the robot. The latter may automatically result in the robot being able to execute an action, because of the enhanced situation understanding that is achieved by the additional information on the object. Since the processing unit permanently reevaluates the situation and the potential actions that may be executed for the success of the task, information that is added to the objects that are involved in execution of the task will immediately be considered for the evaluation and even for the selection of the next action. The selection of action definition candidates is thus performed dynamically taking into account the changing environment of the robot, for example, when the robot is moved to a different position.

It is furthermore preferred that the system stores encountered situations by generating combinations of context descriptors in association with instructions for executing tasks in the past. Storing the history of tasks and the encountered situation which is defined by the combination of a plurality of context descriptors allows to automatically conclude from a situation recognized in the future which task shall most likely be executed. Such an information on the history may not only include an encountered situation and the given instruction in that situation but also how often a similar situation has been encountered without the instruction being given.

Figure 2:
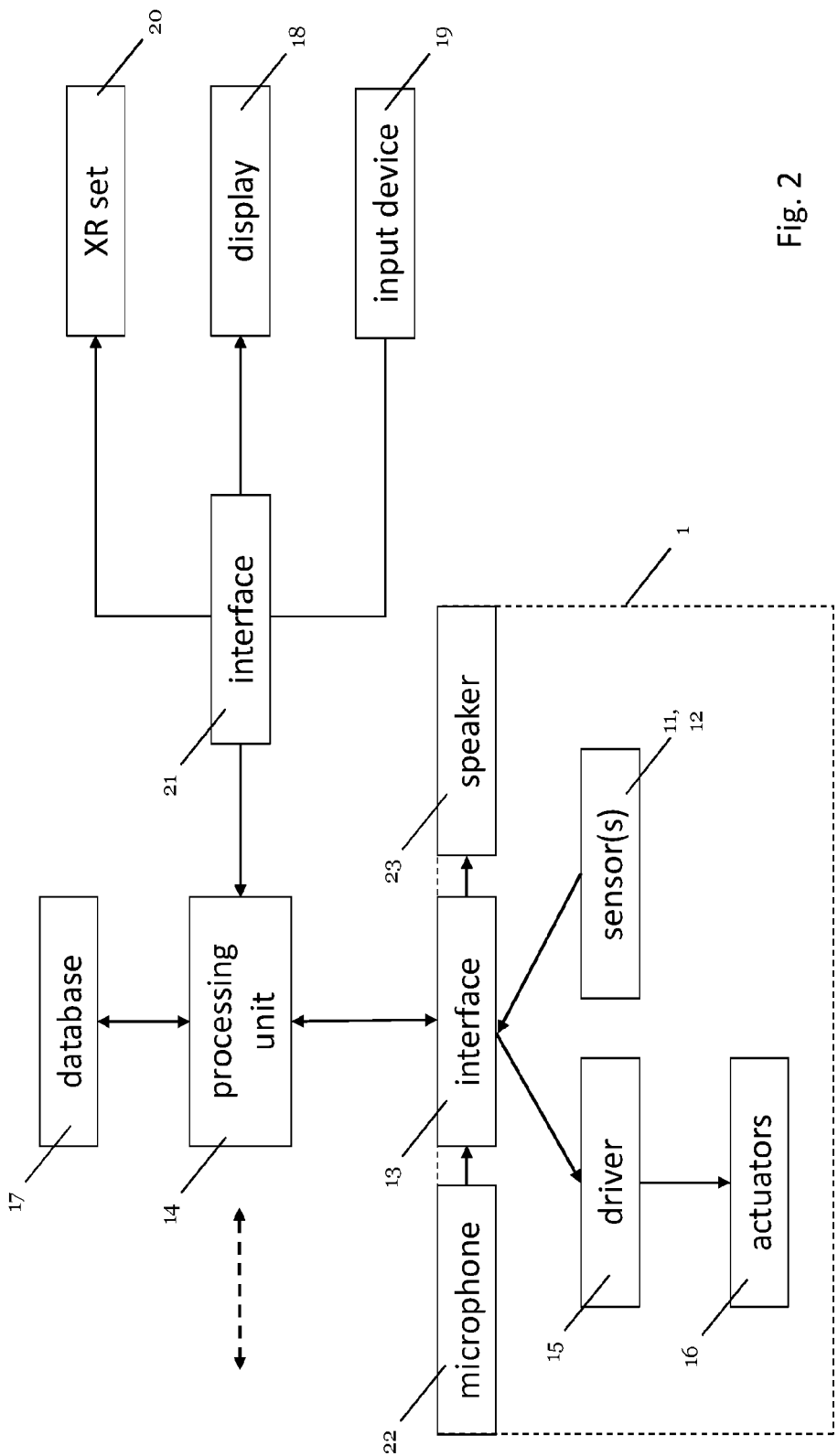
Figure 3:
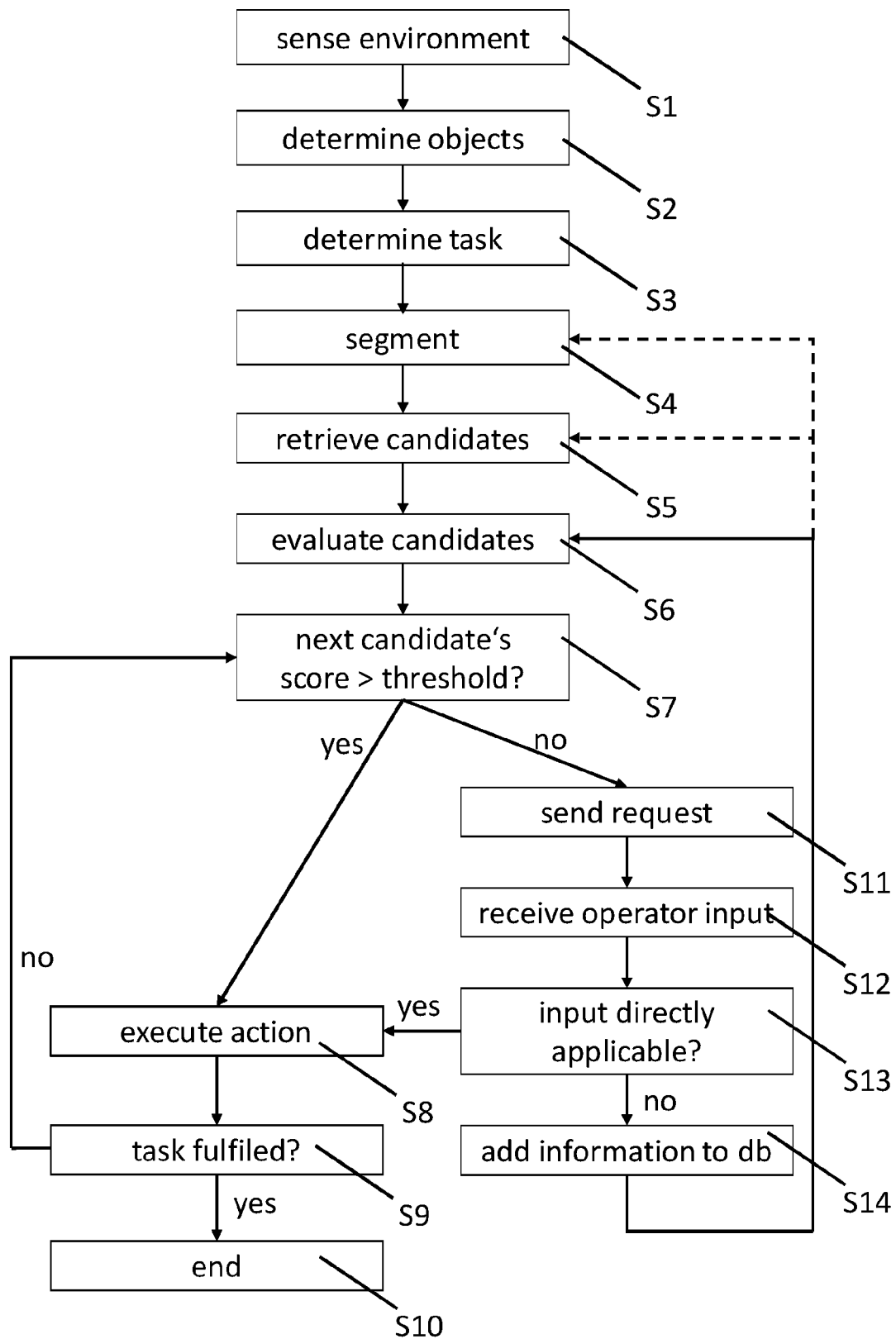

For an improved understanding the system will now be described with reference to the attached drawings in which FIG. 1 shows a simplified diagram of a service robot;

FIG. 2 is a block diagram showing the main units of the service robot system; and FIG. 3 is a flowchart illustrating the main method steps during execution of a task.

FIG. 1 is a simplified diagram of a service robot 1 that is used in the service robot system according to the present invention. The robot 1 as shown in FIG. 1 is only an example and it is self-explaining that other structures of the robot 1 may be used as well.

The robot 1 shall be used for assisting people in fulfilling tasks that may be defined flexibly. Thus, one basic requirement is that the assistance can be offered at various locations. This is achieved by moving the robot 1 to a position where assistance is needed. The robot 1 comprises a robot base 2 that is designed to accommodate a drive system. In the drawings only wheels 3 of the drive system are shown. Motors and energy sources like batteries are not shown and are arranged inside the robot base 2. The specific structure of the drive system is not relevant for the invention and various different structures optimized for the working area of the robot 1 are known in the art. The drive system enables the entire robot 1 to move from an initial position to a target position. The drive system comprises all necessary components for driving and changing directions in response to control signals received.

For executing a task, the robot 1 comprises an end effector 4 that is attached to an arm 5 for positioning the end effector 4. The arm 5 consists of at least a first element 5.1 and a second element 5.2 which are connected to each other by a joint so that the relative angle between the first element 5.1 and the second element 5.2 can be adjusted in order to move the end effector 4 to a desired position and having a desired orientation. In the illustrated embodiment the end effector 4 is designed as a gripping tool imitating the hand of a human. For applications in the daily life of an assisted person such an end effector 4 seems to be the best tool for efficient assistance. Many tasks comprise picking items, maneuvering the items and depositing them at dedicated locations. On the other hand, such a gripping tool is also capable of assisting nursing staff or doctors in hospital. For example, the gripping tool may be used for delivering meals into a patient's room without the nursing staff entering the room. The need for disinfection of clothes, hands, etc. of the nursing staff or doctors can be reduced, as a consequence.

It is to be noted that in addition to the movements of the first element 5.1 and the second element 5.2 indicated by the arrows in the drawing, further degrees of freedom for the first element 5.1, the second element 5.2 and also of the end effector 4 may be realized. In particular, a rotational movement of the first element 5.1 around its longitudinal axis and also of the second element 5.2 around its longitudinal axis could be possible. It is particularly preferred that the end effector 4 can also perform rotational movements about at least two axes that are perpendicular to each other.

The arm 5 together with the end effector 4 attached to the distal end of the arm 5 are mounted to a first lifter 6. The first lifter 6 is fixed on the robot base 2 and, in the illustrated embodiment, comprises a fixed element 6.1 and a movable element 6.2, which may be a hydraulic or pneumatic cylinder. In the illustrated embodiment the movable element 6.2 supports a stay 8 which supports the proximal end of the first element 5.1 of the arm 5.

The first lifter 6 can adjust its overall length thereby elevating the stay 8 over the robot base 2 and, consequently, elevating also the proximal end of the arm 5.

The first lifter 6 allows the end effector 4 to reach higher positions relative to the ground on which the robot 1 stands. The first lifter 6 can be designed rather rigid and, using its capability of elevating the proximal end of the arm 5, the first element 5.1 and the second element 5.2, and also the end effector 4, can be designed to be lightweight and relatively small without losing any operation range.

One preferred application of the service robot 1 is collecting items and bringing them back to their dedicated locations, for example, toys back into the shelf in a children's room or dishes from the table back into the kitchen. In case that the location where the items have to be collected and the respective dedicated locations of the items are distant from each other, this would require the robot 1 to move around quite a lot. Moving around is even more difficult in a situation, where the items to be brought back to their dedicated locations are lying on the ground. With the robot 1 according to the invention this is avoided by providing a second lifter 7 also comprising a fixed element 7.1 and a movable element 7.2. A support structure 9 is attached to the movable element 7.2. The support structure 9, in a simple embodiment integrally comprises a platform 10. The platform 10 serves as a temporary repository so that a plurality of items that are collected using the end effector 4 can be put on the platform 10. Once all items are collected, the robot 1 is moved to a target position from where, one after the other, the items are put deposited at their dedicated locations.

Often, the dedicated locations are not close to the ground and, thus, the first lifter 6 is used to bring up the arm 5 to an elevated position such that the end effector 4 can reach the target position of the respective item. Again, it would be necessary to repeat the operation of the first lifter 6 for each item in case that the platform 10 would be arranged at a fixed height above the ground. According to the inventive robot 1 of the invention, the platform 10 can be elevated, too. It is preferred that the first lifter 6 and the second lifter 7 are designed such that even for the highest elevation of the first lifter 6 it is ensured that without further operation of the first lifter, the arm 5 with the end effector 4 can reach the platform 10.

Preferably, the robot 1 as shown in FIG. 1 comprises a first lifter 6 and a second lifter 7. However, it is also possible to attach the support structure 9 to the first lifter 6 as well so that in any case the platform 10 and the stay 8 are in a fixed relative position to each other for which it is ensured that the end effector 4 can reach the platform 10.

Using hydraulic or pneumatic cylinders as lifters 6, 7 is to be understood only as example. A linear actuator or a spindle may be used as well. Further, the figure shows one-stage-lifters, but two or more stages may be used in case that greater heights above the ground need to be realized.

The benefit of using a service robot 1 for assisting people increases with its independence meaning that the number of situations in which the robot 1 can be operated autonomously increases. Such independency can only be achieved when the service robot system has knowledge about the environment in which the service robot 1 operates. Knowledge on the current location and current status of the environment is obtained using one or more sensors. As examples for sensors that may be used, the embodiment shown in FIG. 1 carries a first camera 11 and a second camera 12. The first camera 11 is attached to the second element 5.2 of the arm 5 and moves together with the second element 5.2. An image captured by the first camera 11 will therefore show details of the environment of the robot 1 only in proximity to the end effector 4. Since the robot 1 (rather its processing unit as will be described later) also needs to have an overview over the environments of the robot 1, the second camera 12 is configured to capture images of a greater area of the robot 1.

Although a first camera 11 and a second camera 12 are shown in FIG. 1, other sensors that are capable of physically sensing the environment and, thus, obtaining information on the environment that allows to generate a representation of the environment may also be used. Examples may be RADAR sensors, LIDAR sensors, ultrasonic sensors and the like. Further, the entire service robot system may also make use of sensors that are fixedly mounted in the environment in which the robot 1 operates. As an example, a surveillance camera may be used. Finally, the number of sensors is not limited to two as shown. Specifically in case that there is one sensor attached to the arm 5 or any other movable support that allows to move the sensor to different locations, only one sensor may be sufficient. The information on the environment of the service robot 1 is then collected obtaining information from different positions and/or orientations of the single sensor. Of course, even if a plurality of sensors is used in order to generate a representation of the environment of the service robot 1, more than one capture per sensor may be used. How much information is obtained from the environment may be adjusted in response to an analysis of the environment which is performed by the processing unit as will be described later. For example, in case that the reliability of the information that is obtained from sensing the environment (certainty of identifying an object correctly) does not seem to be sufficiently high, the robot 1 or at least the elements that carries a movable sensor, like the first camera 11, may be moved to obtain additional information by sensing the same environment of the robot 1 from a different perspective. Furthermore methods like sensor fusion, 3D reconstruction, overcoming of occlusions might be used.

FIG. 2 is a simplified block diagram showing the overall layout of the service robot system. The service robot 1 explained in detail with reference to FIG. 1 is one major component of the entire system. The robot 1 comprises the sensors, which, as mentioned above, may be cameras 11, 12. Further, the robot 1 comprises an interface 13 connected to the sensors in order to transmit signals comprising information on the sensed environment to a processing unit 14. It is self-evident that in case some or all of the sensors are arranged outside the robot, individual interfaces for transmitting the sensor signal to the processing unit 14 are needed.

The processing unit 14 in the illustrated embodiment is arranged outside the robot 1. However, it would also be possible to include the processing unit 14 in the robot 1. Having the processing unit 14 outside the robot 1 allows to make use of the processing capabilities of the processing unit 14 not only for a single service robot 1 but to a plurality of robots. Communication with other robots is indicated by the dashed arrow. Further, the processing unit 14 does not need to be realized by a single processor but may also be a plurality of processes cooperatively processing the signals received. It is also possible that such a plurality of processors commonly establishing the processing unit 14 is distributed with some of the processors arranged in the robot 1 and some of them being arranged at a remote location and communicating via respective interfaces with each other.

It is even possible that each of a plurality of robots 1 makes use of at least one common processor but comprises individual processors as well for internal signal processing. Such internal processors may particularly be used for generating control signals, as it is indicated by driver 15 that generates control signals for actuators 16 based on information on actions to be executed received from the processing unit 14. Actuators 16 shall indicate all individual actuators that are necessary for driving wheels 3, the lifters 6, 7 and positioning the arm 5 including the end effector 4.

The processing unit 14 is connected to a database 17 in which action definitions are stored. An action definition defines a general algorithm for executing a certain action by the robot 1 without precisely defining a trajectory. Actions are, for example: grabbing an item, moving to a different location, placing an item on a table and releasing it, . . . Further, the action definitions may be organized in a hierarchical structure such that starting from elementary action definitions, such elementary action definitions may be combined to establish a higher level action definition. The action definitions may be organized in only 1, 2 or more levels of the hierarchical structure. Starting from the action definitions given as examples above, the higher level action definition may be for example: "putting back a dropped item onto a table" comprising above mentioned actions. Of course, the actions given as examples above may even have a higher granularity.

The crucial aspect of the operation of the inventive service robot system is a communication of the robot 1

(inclusive its "intelligence" in form of the processing unit 14) with an operation center in which an operator supports the operation of the robot 1 in case that the robot 1 (inclusive its "intelligence") is not capable of dealing with a situation on its own. This is achieved by connecting the processing unit 14 at least with a display 18 (preferably a plurality of displays) and an input device 19 via a communication center interface 21. The display 18 is used for outputting information to a human operator that allows the operator to estimate the current situation of the robot 1. Assisting the operation of the robot 1 may be performed in the different ways:

- directly controlling the motions of the robot,
- selecting an appropriate action definition from the database or
- adding information identifying objects and/or characterizing objects in the database 17.

The display 18 displays a representation of the environment of the robot 1 including the robot's location and close-by obstacles that are identified from the sensor outputs. In case that the sensors include one or more cameras 11, 12, the captured images can be displayed as a live camera feed as well. When a plurality of cameras 11, 12 is used, the operator can switch between different cameras in order to ease control of the robot 1. Alternatively or in addition the display may be used to provide information on identified objects or unidentified objects but also current status of an evaluation of the situation performed by the robot 1. As it will be explained later, this may result in providing suggestions for actions that might be executed by the robot, but it could also result in asking questions in case that the response received from the operator causes further ambiguities.

To start the operation of the robot 1, a task to be executed needs to be determined. The determination of a task to be executed is performed also in the processing unit 14, using a respective software module. Thus, the determination unit is a software module executed by the processing unit 14. Again, a dedicated processor may be used for executing the software module of the determination unit. For determining the task to be executed, signals from the sensors are processed. One sensor may for example be a microphone 22 so that a spoken instruction from the user of the robot 1 can be analyzed to derive a task therefrom. Another way to determine a task to be executed may use a history of tasks that had been executed in the past, and information on the situation in which this task had been executed. In that case, the determination unit compares a currently encountered situation of the robot 1 with information on situations in which a specific task was executed in the past using so-called context descriptors. The association is stored in the database 17 as well. Based on signals from the sensors, the processing unit 14 compares a current situation of the robot 1 with stored situations of the database 17 wherein the situations are defined by a combination of context descriptors. In case that a similarity lying above a threshold is identified, the task associated with the situation is determined to be intended.

Once the task is determined by the determination unit, the processing unit 14 tries to find a solution to execute the task autonomously. The processing unit 14 retrieves one or more action definition candidates from the database that are, based on the information on the environment derived from the sensor signals, assumed to contribute to successfully executing the task. The action definition candidates are searched in the database 17 by searching tags that describe objects by defining characteristics of the objects after objects in the environment of the robot 1 have been identified from an analysis of the signals received from the sensors. The operator will only be requested to support execution of the task in case that autonomously operating the robot 1 is not possible or at least not reasonable. Details of the analysis that leads to the decision whether the operator shall be requested to assist will be given later.

When the processing unit 14 comes to the conclusion that autonomously executing the task is not possible or not reasonable, it will send the request for assistance via the communication interface 21 to the remote operation center. In response to the request received from the processing unit 14, the human operator will control the robot 1 or add information to the system's database 17. As mentioned above, controlling the robot 1 may be directly controlling motions of the robot 1 using for example controls as an input device that resemble controls for a computer game or selecting a suitable action definition from the database 17, may be based on a proposal made by the processing unit 14. According to a more preferred embodiment, the system comprises also a virtual reality set 20 allowing the operator to see a virtual object and to virtually navigate the robot 1 close to it, for example. The virtual reality set 20 does not only comprise a virtual reality headset but also a virtual reality controller that allows the remote operator to determine, for example, a grasping pose in virtual reality before sending a corresponding action definition to the robot 1. Thus, using the virtual reality set, it is possible to avoid any collisions of the robot 1 that are likely to occur because of lag times in case that the robot 1 directly controlled.

For controlling the robot 1 using the virtual reality set 20 it is advantageous to use a 3D camera as first camera 11 in order to generate a 3D representation of an object that is intended to be grasped by the end effector 4 and also of its environment. The correct grasping pose of the end effector 4 can be determined when a model of the physical gripper is assigned to the virtual reality controller representation in the virtual environment (or augmented reality). The remote operator can then place the 3D representation of the real gripper next to the virtual object. A second controller is used for remotely controlling the operation of the drive system.

In the following, a typical process in a situation where an initial setup of the system has already been performed shall be explained in detail using the simplified flowchart as shown in FIG. 3.

First of all, in step S1, the environment of the service robot 1 is sensed using at least one sensor which may be mounted on the service robot 1 or at suitable locations so that the environment of the service robot 1 can be analyzed. Based on the sensor output, objects in the environment of the robot 1 are identified in step S2. The sensors may be of the same type or of different types. The service robot system now needs to determine a task. Determining a task to be executed by the service robot system in step S3 may be performed in a plurality of different ways. The most preferred one is an autonomously acting robot 1, which includes autonomously determining a task to be executed. In many cases however, the robot 1 will not recognize what to do on its own, and, thus, needs assistance. A typical way of instructing the robot 1 what to do next, is a direct communication between a user and the robot system. Such a communication with the robot 1 may be performed using the microphone already explained with reference to FIG. 2 but also a speaker 23 so that the robot 1 is able to output information to the user. Instead of the microphone 22 and the speaker 23, a further interface may be provided for connecting the robot to user equipment such as a smartphone. In that case, inputting an instruction that allows the robot system to determine the task to be executed may be performed using the smart phone or a comparable device. Generally, it is possible to supply information to the robot system in a plurality of different ways, including SMS, an App, spoken instructions or gestures of humans. Some of these "information channels" may require additional interfaces to connect the robot system with another IT system, for example cameras providing signals that can be processed by the service robot system in order to determine gestures and analyze them for determining a task.

Using the microphone 22, the robot 1 is able to receive a spoken instruction from the user. The processing unit 14 may then, based on the received spoken instruction, determine the task which the user intends to be executed by the robot 1. Similarly, instructions may be given by the user using SMS or making a gesture, for example, pointing to an object. Pointing to an object can be understood by the system to focus the determination of a task on this particular object. In case that the object being pointed at is a trash can, the determined task is identified as a potential action that can be executed on the specific object. In case of the trashcan this might be "Empty the trash can".

More preferred, the robot 1 will determine on its own (using knowledge on its environment and potentially also additional information gathered from sources connected via interfaces) the task which is most likely to be executed. In case that the likelihood that a particular task is to be executed exceeds a given threshold, which may be adjustable, the robot 1 may automatically start determining the necessary actions to be executed for executing the determined task. Potential tasks can be stored in the database 17 and be searched for a task that is likely to fit to the present situation. In case that the likelihood that the correct task to be executed is determined not sufficiently high, the robot 1 may ask a question either to the user, for example, by means of the speaker 23 or to the operator by other interface 21. The user or the operator may then instruct the robot 1, by confirming a task that was suggested by the robot 1 or, in case that no suggestion is made by the robot 1, by directly instructing and defining a task to be executed.

It shall be explained now how the robot 1 can determine a task from a user by the microphone 22 mounted either directly on the robot 1 or anywhere in the working area of the robot 1 and connected to the service robot system so that the processing unit 14 (and thus the determination module) can obtain spoken instructions and based on such received spoken instructions derive information on an intended task to be executed. For example, a user of the robot 1 may instruct the robot 1 by saying: "Clean up the children's room". In such a case, the robot 1 receives such a clearly defined task and no evaluation of the environment of the robot 1 needs to be made by the robot 1 in order to determine the task in step S3.

It is to be noted that the robot 1 does not only use the microphone 22 for listening to any spoken instruction but the robot 1 will always "listen" whether the user gives a spoken instruction. This is particularly important, because the instructions directly addressing the robot 1 always overrule any task and action currently executed by the robot 1. This ensures that the robot 1 does not proceed with executing a task which is considered to be not appropriate by the user of the robot 1. Such an interruption will cause the robot to directly proceed to the next safe state. An example may be cleaning up the children's room but the children's room is currently needed for the children still playing there. In order to avoid the collision of interests, the previously determined task, be it instructed by the user or autonomously determined by the robot 1 as explained hereinafter, is overruled by the last instruction given by the operator or the user.

The robot 1 analyzes the currently encountered situation and compares it with prototypical situations that are stored in the database 17. Prototypical situations are situations encountered in the past which resulted in the same task to be executed. Prototypical situations may also be defined a priori when the service robot system is designed and programmed. For analyzing the situation, the processing unit 14 collects data describing the current situation. Each piece of information is stored in form of a descriptor. A plurality of descriptors combine to a prototypical situation. In case that a task is instructed to be executed by the robot 1, the information on the combination of descriptors in that situation is stored associated with the instructed task. When in the future a situation similar to such a prototypical situation occurs, the comparison between the stored information on the situation (combination of descriptors) and information derived from the sensor signals sensing the environment of the robot 1 in the currently encountered situation may reveal that there is a high similarity between the encountered situation and the prototypical situation. Then, it can be concluded that the task stored associated with the prototypical situation is intended to be executed, again. Thus, the processing unit 14, based on information collected in the now experienced situation and perceived by the sensors (and/or retrieved from other sources), calculates a measure for the similarity between the stored prototypical situation and the currently experienced situation. In case that this measure is above a threshold which might be adjustable, the processing unit 14 retrieves the task that is stored associated with the prototypical situation identified to be sufficiently similar to the currently experienced situation of the robot 1.

Occurrence of situations that repetitively occur may also be perceived by the system, even without an instruction being received in these situations. The observation can be communicated to the operator, who then can label this as a new prototypical situation and, preferably, associate a task with this new prototypical situation.

The "situation" is defined using descriptors as mentioned above. A combination of descriptors comprising a plurality of independent descriptors will make up such a prototypical situation. These descriptors may not only comprise information on a location, time of day, weekday or difference between the current state of the environment and a target state. Descriptors may also include information obtained via interfaces from other information sources. For example, an information source might be a calendar of a user. Entries in the calendar may often trigger specific tasks to be executed by the robot 1. One example, still referring to the situation of cleaning up the children's room, is an entry like "play date" in the calendar. When trying to determine a task to be executed next, the robot 1 (rather its processing unit 14) searches for information sources that are in communication with the processing unit 14. When the robot 1 recognizes based on a comparison of the current time of day with entries in the calendar that the play date should have ended, it is highly likely that the children's room needs to be cleaned up. Even social contexts may be included in the decision which task is to be executed. Cleaning up a room, for example, may be carried out in a different manner before children's friends arrive and before the grandmother comes for a visit.

Since execution of tasks is stored associated with descriptors of a situation in which the robot 1 was instructed to execute the task, the service robot system will gain experience over time. However, an analysis of the currently encountered situation will often lead to an ambiguous result and consequently the robot 1 is not in a position to autonomously determine the task to be executed. Although the frequency of occurrence of such ambiguous situations will decrease over time, there is a need to assist the determination unit in identifying the task to be executed. In order to avoid that the robot 1 will execute a task that is not reasonable in the current situation, it is not sufficient to always select the task corresponding to a prototypical situation showing the highest similarity with the stored prototypical situation. In such a case it might become necessary to ask either the user of the robot 1 or the operator in order to clearly define the task to be executed. A second threshold being lower than the first threshold may be introduced. The first threshold should be set high enough to ensure that only one task fits to the situation in which the robot 1 currently is. With the second threshold set lower there is a certain likelihood that a plurality of stored prototypical situations that may show a similarity with the currently encountered situation below the first threshold but above the second threshold. In such a situation, the service robot system may output a question (request for assistance) which is directed either to the user or to the operator. The question may suggest tasks associated with the prototypical situation for which the similarity above the second threshold but below the first threshold has been determined. The question may be asking for confirmation of one of these tasks or may be an open question such as: "What shall I do?" in case that no prototypical situation could be identified based on the obtained information on the situation and no associated task could be determined.

In case that the request for assisting the determination unit in determining the task in step S3 is sent to the operator in order to obtain information on the task to be executed, all the information that is collected by the processing unit 14 from all available sensors and also other sources of information is also forwarded to the operator and, for example, output via the display 18, or a speaker not shown in FIG. 2. Thus, the operator gets knowledge on the situation of the robot 1 that resulted in the question being asked. The operator may then even label the specific combination of descriptors of the situation in order to make it easier in the future to respond to requests received from the robot 1.

Once a task to be executed has been determined, the process moves on to step S4, in which the analysis of the task to be executed starts. The database 17 comprises a number of action definitions. Each of these action definitions may be built by a plurality of actions, which may comprise a plurality of further actions themselves. This means that each of the action definitions stored in the database 17 may be combined with one or more other action definitions resulting in a new action generated by this combination. Although it would be possible to store for any possible combination of action definitions that is executable a new, higher level action definition, such an approach is not reasonable. It is rather preferred that the task to be executed is segmented into smaller pieces each of which may then correspond to a single action for which an action definition is stored in the database 17. Since the action definitions as stored in the database 17 may have a multilevel structure, such a single action definition may obviously consist of a combination of other action definitions. Once the task is segmented into a plurality of actions to be executed (if necessary), the processing unit 14 starts retrieving potential action definitions as candidates in step S5 and evaluating these action definition candidates from the database 17 in step S6 and step S7.

The processing unit 14 has an assessment function allowing to judge whether a specific action is likely to be successfully applied in the current situation. The processing unit 14 calculates a success score for each action which would be applicable in the current situation (action definition candidate). Based on this success score, the action to be used for executing the task may be selected. The success score is a measure allowing a comparison between different actions regarding their chances of success when applied to the current situation. For example, the score may be a likelihood or probability. Once the success score has been determined for an action definition candidate, the score is compared to a threshold. In case that the score exceeds the threshold it is concluded that the success of an action, if executed, is sufficient for the present situation. It will be explained later with respect to examples that such an evaluation takes into consideration the objects involved in the action by adjusting the threshold.

The described evaluation of one or more action definition candidates is performed in step S6.

The execution of a task is performed by executing one action after the other. Thus, after segmenting the task to be executed in step S4, and after evaluating the action definition candidates in step S6, the further execution of the task may be performed in two different ways. In case that the success score for the action definition of an action which is to be executed next lies above the given threshold (comparison step S7), and this action definition is the candidate having the highest success score of all evaluated action definition candidates, the action will automatically be executed in the next step S8 based on this action definition. After execution of this action has been completed, it is determined whether the initially determined task is completed.

Thus, the results achieved by the action and the target state as defined by the determined task are compared in step S9. In case that the task is completed, the procedure ends in step S10. In case that the task is not yet completed, the procedure goes back to step S7 evaluating the next action to be executed. It is to be noted that executing an action may result in a change of the environmental situation of the robot 1. Thus, contrary to the arrow that leads from step S9 to step S7, the changing environmental situation may lead to searching new action definition candidates, retrieving them from the database 17 and evaluating them before the comparison of the success score with threshold can be performed in step S7.

In order to learn from its operation history, the system stores situations in which it had been operated. For each situation, the system stores actions that correspond to action definition candidates associated with information whether performing this action in the respective situation has been successful. This allows to conclude that an action corresponding to such action definition candidates being performed again in an identical situation will be successful again. In case that the success score is a value between 0 and 1, the resulting success score in this simple example could be 1. If no similarity between the current situation and any stored situation in the database 17 can be identified, the resulting success score would be 0. Since it is very unlikely that for every actual situation and identical situation already occurred in the past, but a success score shall be determined even for such new situations, the determination of the success score uses a calculation of a similarity between the currently experienced situation and situations that are already stored in the database 17. For the above explained example with a success score between 0 and 1, the resulting success score will be the closer to 1 the higher the similarity between the stored situation and the actual situation is. Vice versa, the success score will be the closer to 0, the lesser of the similarity between the two situations is. Of course, it is possible to take into consideration not only the stored situation having the highest similarity with the currently experienced situation but a plurality of stored situations. The similarity calculation may take into consideration visual parameters, for example classified objects but also effects of the context, for example presence of persons. The similarity calculation does not take into consideration any ambiguity in determining the currently experienced situation but assumes that the output of the situation perception is correct.

In case that a plurality of actions is needed to perform the task in the cooperative manner, each corresponding action definition candidate is evaluated as described above. Further, the sequence of action definition candidates necessary for performing the entire task may also be evaluated. This could be achieved by combining the success scores of each action definition candidates participating in performing the entire task.

It is to be noted that the determination of a success score for an action definition candidate is needed at a later point in time in order to perform the overall task, a future situation achieved by performing preceding actions is predicted. This situation is then used for the similarity calculation in order to determine the success score for the succeeding action definition candidate. The evaluation is continuously repeated so that it can be taken into consideration if the predicted future situation cannot be achieved by a performed action, for example due to inaccuracies in positioning but also changes in the environmental situation.

The target state is defined by the task. Information on the target state for a task may be changed by the operator, for example, by adding details the target state.

The target state may also be defined indirectly by tags of objects involved in the situation, indicating their regular location or status.

If, for executing the determined task, a sequence of actions is determined with success scores lying above the threshold, the service robot system will be able to execute the entire determined task autonomously. However, it might occur that during execution of the sequence of actions, an action to be executed next for which no score above the given threshold was calculated is reached. This is a clear indication that the system cannot execute the action on its own without risking failure of the system. In that case, after the comparison of the success score of the respective action definition candidate in step S7 reveals that the score does not exceed the given threshold, the service robot system sends a request to the operation center in step S11. The operator will receive the request and, using the display 18, the input device 19, and/or the augmented/virtual reality set 20 will analyze the situation and give respective advice to the service robot system by inputting information and/or control signals for directly controlling the robot 1 or instructing to use action definitions stored in the database 17.

The request sent from the robot to the operator may include an urgency indicator and/or information selected based on the urgency indicator and to be transmitted along with the request in order to assist the operator to cope with a plurality of robots 1 simultaneously. The urgency indicator indicates to the operator an actual need for his assistance. The urgency to indicator may be calculated from a maximum achievable success score in the actual situation of the robot 1 taking into consideration further parameters, for example, a tag of an involved object. The greater the difference between the calculated success score for the determined action definition candidates and the maximal achievable success score is, the higher is the value of the urgency indicator (assuming that a higher urgency indicator value means that assistance in that situation is more urgent). However, even for the same success score calculated for the present situation, particular aspects of the situation or the tasks to be performed may influence the urgency. One example could be picking an object from the table. This task may, in first place, lead to the same success score, but it makes a great difference whether the object to be taken is breakable or unbreakable. Thus, for an object which is tagged as "breakable" a higher urgency indicator may be used.

In case that the entirety of robots 1 in the system is supervised by a plurality of operators, the urgency indicator may also be used to distribute the requests to the different operators.

The urgency indicator may also be used to define the information that is presented to the operator. The higher the urgency is, the more information is presented to the operator. For example, in case that immediate assistance by the operator is needed, the operator is provided with all information needed to quickly identify the situation in order to decide on needed assistance. In addition to images taken by a camera of the robot 1, distances or other sensor values might be presented. Contrary, situations having a low urgency could only require to transmit a camera image so that the operator may monitor the current situation and can interrupt in case of an unexpected development. In general, the type and amount of information regarding a situation of a robot 1 is adapted to the urgency determined as explained above.

For directly controlling the robot 1 to perform a certain action, the operator uses controls to maneuver the robot 1 to execute a desired action in order to proceed with the execution of the determined task (step S12). In step S13 it is determined whether the operator's input can be directly converted into a movement or motion of the robot 1. If yes, the action as instructed by the operator is executed in line with the remote control input received from the operator. Thus, the process jumps to step S8 and will automatically proceed, after the action defined by the operator has been completed, as described before with respect to an action that could be executed autonomously.

In case that the input of the operator in step S12 is not a direct instruction for motions and maneuvers of the service robot 1 and thus no definition of an action to be performed directly, the process proceeds to step S14. As described above, the operator may directly instruct the robot 1 how to proceed with executing an action but, alternatively, the operator may also add information to the database 17. Such added information may then allow the system to make an improved evaluation of action definition candidates, but also to "reconsider" the segmentation of the task and/or selection of action definition candidates. This is indicated by the dashed line in the flowchart.

It is to be noted that inputting directly applicable instructions for the robot 1 may be performed in 2 different ways: first, any instruction that is input by the operator is immediately and directly executed by the robot 1. Second, the virtual reality set 20 may be used to set up an action in advance by only defining the action to be executed, and, after completing such an action definition, send it to the robot 1 which will then autonomously execute the newly defined action. In case that augmented reality is used, the instruction may be generated in advance but may also be applied directly.

The outcome of the evaluation of the action definition candidates strongly depends on the knowledge the robot system has regarding its environment. Thus, additional information that is input by the operator in step S14 is used to enhance the knowledge base of the robot. Depending on the input given by the operator, the information that is added, for example, to an object involved in the action to be executed, may be sufficient to allow the processing unit 14 thereafter to cope with the situation without further input by the operator. Thus, such an input, which could be an additional characteristic of an object or condition for acting on an object, may result in an increase of the success score for an action that is evaluated. If so, the process will then proceed to step S8, as described above. If the information added by the operator is still not sufficient to increase the success score for an autonomous operation of the robot 1, step S7 will result in a new request that is sent to the operation center. The operator may then decide again whether a direct control of the robot 1 is appropriate or whether he would prefer to improve the database 17 by adding further information.

Retrieval of action definition candidates in step S5 is based on identification certainty and also on information that is available for each identified object that is involved in execution of an action. For example, in case that a cup is on the table and shall be moved a different location, the first action to be executed would be gripping the cup. Information that is included in the tags of the object "cup" defines the actions that can be executed with respect to the identified object. For a cup, the information in the tags may even include further characteristics, like for example sensitivity to mechanical stress. A cup made of china needs to be handled with more care than a cup made of metal.

As the above given explanations reveal, the operator will input additional information in step S14 thereby improving the robot's "understanding of the real world". The operator will try to input additional information for all the objects that are involved in a scene as currently perceived by the robot 1. This results in two different ways of improving the operation of the entire robot system over time: on the one hand, the action definitions that are stored in the database 17 are improved and a higher variety of different action definitions will be available for future assessments of new situations for the robot 1. On the other hand, the knowledge base for the robot 1 is improved by adding information for determined objects in the sensed environment of the robot 1. By adding this information, information that is used by the processing unit 14 when predicting the success of an intended action is improved. Thus, with any new information that is added to the database 17, the robot's 1 capability of autonomously executing a task will be improved.

It is to be noted that the invention is explained with reference to "objects". But objects are only used for an improved understanding. In fact, objects are given only as examples for "entities", which may consist of a plurality of objects, or even a plurality of lower level entities, which in turn may be a combination of objects. In a hierarchical sense, a house comprises a kitchen, roof, . . . , while in turn a kitchen comprises a stove, dishwasher, etc. Note these higher level entities can get inferred out of the presence of other objects and it can get inferred that there is a kitchen, in this example. This approach is known as bootstrapping. Having determined the location "kitchen" then even allows to determine partially occluded objects in the kitchen.

Besides the action definitions, the database 17 also stores all the information that is collected over time. The processing unit 14 takes this information into account when evaluating the currently encountered situation and decides whether the operator needs to be contacted or the robot 1 is able to successfully execute the next action. This information can also be called "world knowledge". The world knowledge is improved every time information is added to any one of the objects for which models are stored in the database 17, or entities consisting of objects. The model allows to identify objects that are present in the environment of the robot 1. The identification uses the sensor outputs which are compared to the models stored in the database. When sufficient similarity between the stored model and the information derived from the sensor can be recognized, the object can be considered to be identified. Each object stored in the database 17 may comprise a plurality of associated pieces of information, called tags. Each tag is a specific piece of information and may be linked to allowed actions to be executed on the object or entity. The additional information is added to the database 17 every time the robot system cannot handle a current situation autonomously and the operator inputs additional information in response to the request for assistance received from the robot 1. All currently available information, which is also used by the processing unit 14 to search for and evaluate action definition candidates, is presented to the operator. The operator then judges whether adding information in form of additional tags for an object or entity would improve the world knowledge of the robot system in a way that it improves the overall performance or directly controlling the action of the robot 1 is needed.

The additional information that is added by the operator is not limited to adding new tags or correcting tags of existing objects that are already identified. In case that an object cannot be recognized at all by the system, the system will also contact the operations center and request for assistance. The operator, being provided with an image (representation) of the object in question, can then add the new model (new entry) in the database together with all the information the operator currently has and which he considers as being helpful. Thus, when an object is identified as being an object for the first time by the robot system, the system will automatically contact the operator for improving the system's world knowledge. The additional knowledge is immediately available for the processing unit 14 after being input by the operator. Thus, even when the unknown object is recognized for the first time while executing a task, the additional information can be used in the next step of executing the task. To assist the operator in adding information to an object, the system may also propose already available tags, which had already been added to similar and known objects previously. The operator can then select from the proposed list the one which he considers to fit best. However, it is also possible to make an operator defined entry.

The information that is added for an object is not limited to characteristics of the object but also comprises executable actions or conditions for execution of an action. For example, in a case where a shelf with doors is perceived for the first time by the system, the respective representation, most likely an image, is displayed by the display 18. The operator may then denote the object as being a shelf, add the information that the shelf comprises doors but also information on a sequence of actions that need to be performed in case that objects shall be put in the shelf. The sequence would comprise at first opening the door. Thus, if this object is identified in the future by the system, it is known to the system that objects may be put into the shelf but that at first the handle needs to be grabbed for opening the door.

While above given explanations all require at least basic world knowledge to exist in the system, it is evident that a system which is set up for the first time does not have any such world knowledge except for stored models of real-world objects that are already present in the database 17. The most common objects are stored during the design phase of the system before the robot system is installed in its actual working environment. When setting up the system in its actual working environment, it might be helpful if not only the operator can input information to the system but also the user of the robot 1. Thus, it could be considered to provide the robot 1 with an interface to user equipment, such as a smart phone, tablet or the like. In the setup phase, the robot 1 will then collect data on objects that can be sensed in the environment of the object. A representation of such an object is presented to the user who will then enter information.

In order to add information that allows the robot 1 to determine how to execute a task, it is also needed for example to define a target state, for example, of every single object. Such target states are necessary for interpreting a task. For example, the task "clean up the room" could mean that every object is put back to its dedicated location. When for each object the dedicated location is stored in the tags associated with the object, the robot system may consequently know the dedicated position of each of the objects and move them to this location after recognizing that the current location of the object differs from the dedicated location.

Starting from basic knowledge allowing the robot 1 to identify for example different rooms and furniture, layouts and typical objects in a household, the robot 1 will then learn and generate improved world knowledge. The world knowledge is stored in a hierarchical structure. This means that for example the house (entity) consists of a plurality of rooms (lower level entities).

Each room comprises a plurality of objects that are in the room. Objects may be stationary or movable. Examples for stationary objects may be an oven or a refrigerator, which are specific for the room type "kitchen". Other objects may be movable and therefore can be encountered in a multitude of rooms. Movable objects can either move by themselves (a pet bird, for example) what can be moved (a Lego brick, for example). For these movable objects, preferred rooms may be defined by the user or operator, or can be learned over time.

Starting from such a basic knowledge of the working environment of the robot 1, then the first tasks may be given to the robot 1. Improving the world knowledge is then achieved step-by-step, any time the operator gets involved. As the world knowledge of each robot 1 increases over time, it is possible that in the end the operator is able to supervise quite a number of robots. However, in an early phase of operation of a newly set up robot 1, it is likely that an operator may only focus on a single robot 1. It is particularly advantageous that the plurality of robots may use the same "intelligence" (processing unit 14 and database 17 or parts thereof), because adding information to the database 17 can then improve the knowledge base of a plurality of robots 1. The other way round, each time one of the robots 1 requests assistance, the added information is immediately available for all the robots 1 referring to the same database 17.

In the following, examples shall be given that allow to understand how the tags that are added to a specific object allow to control which action is performed or may be performed by the robot 1. For explanation, the action that shall be performed by the robot 1 is picking up a cup. This action that is needed for cleaning up the kitchen or a table, for example, might be necessary to be performed in a plurality of different situations:

First, a situation is considered which is already known to the system, either because it was already executed in the past successfully or because the identification of any object that is involved in the situation can be performed without any ambiguity and the context is also known. In such a case, the execution of the action "pick up cup" can be performed perfectly autonomously by the robot 1. The operator does not need to be contacted.

Then, there are at least partially unknown situations in which the cup shall be picked up. In that case, the confidence that the correct action can be automatically determined by the system is lower than in the first case. However, if in such a situation the tag "unbreakable" can be found in the description of the object "cup", the robot 1 may nevertheless try to carry out the most likely action. This is a trial and error scenario, where the robot 1 can execute the action and, after the action has been executed, analyze the results. Based on the additional information included in the tags of objects, the risk assessment by the processing unit 14 is performed. The tags may also include instructions to obtain additional information before it is finally decided whether an action can be performed or not. For example, in the case that the object to be picked up is a cup, the tags may include the instruction to determine whether there is still liquid in the cup or not. When it is determined that there is liquid in the cup, this may result in inhibiting the trial and error approach even if the trial and error approach would be allowed in cases for an empty cup.

The third case is a scenario where only moderate risk is allowed when the cup is picked up. This could be the case when the cup is identified to be made of china and thus could break if the action is performed not successful. In such a case, the identified action can be proposed to the operator who then, in response to this request, confirms that the action may be carried out or takes over control. When a pickup problem is solved by an action that is based on an action definition suggested by the robot system, the system prompts the operator to tag the object accordingly. An example is a plate that could not be clearly identified by the system but a pickup operation was suggested by the system and confirmed by the operator, and the operation is finally executed successfully. In such a case, the system prompts the operator to add that the specific picking action is one potential action to be executed on the plate.

Last, entirely unknown situations, where autonomously selecting an action by the system is impossible, may occur. This will happen anytime the system cannot identify an object that needs to be handled by the action. In that case, the processing unit 14 cannot identify and retrieve any potential action definition in step S5 available in the database 17 and, consequently, directly request the operator for assistance.

What was explained with respect to a pickup operation can happen for any possible action: there is always a range from carrying out an action entirely autonomously to a situation where no action at all can even proposed by the system. This becomes evident, when depositing an object is considered: For many objects, a plurality of orientations may be correct. For example, a book may stand upright as it is usually the case when the book is put back into the shelf, but it may also be put on its wide side surface. The decision, which of the possible orientations is correct must be made dependent on the specific context. In the tags that characterize the objects, conditions can be defined that allow the correct determination of the orientation when depositing the object. In case of the book, the conditions might be: the target location is a table (or more general: large surface), then the book shall be placed on its wide side surface. Contrary, when the target location is a shelf and the book shall be placed in a gap between other books, the orientation must be upright.

Similar to the explanations given above with respect to the pickup operation, a risk assessment may also be used for depositing an object. In case that a low risk is determined from all the information available, a trial and error approach may be chosen and when the estimated risk is above a certain threshold, the operator gets involved by sending a respective request.

Sometimes, situations may occur where the robot 1 could learn from a decision taken by the operator. For example, the robot was given the task to clear a table on which a plurality of objects can be found. So the evaluation of the possible actions reveals that no unambiguous sequence can be determined with sufficient likelihood. Although a pickup action can be predicted to be executed successfully, the same is true for picking up a different object. In that case, two distinct actions are identified by the system, both having a success score which is comparable. In such a situation, the system will also request assistance from the operator to select the action to be performed first. As both actions fulfill the requirements to be autonomously performed by the system, this could trigger a request for assistance forcing the operator to input a rule for deciding the priority of actions (objects) for the next time when a similar situation occurs.

In response to the request, for example, the question "Why?", additional information can be input by the operator. In the example, possible reasons could be: least effort, easiest to access, preferred cup, . . . In a case where no clear reason can be defined by the operator, this could also be indicated by the operator. In future situations, the robot system may then select the action to be performed first by chance.

The invention claimed is:

1. A service robot, comprising a drive system (3) for moving the service robot's base (2) to target positions, wherein an effector (4) for manipulating the service robot's environment and a support structure (9) are mounted to at least one lifter (6, 7), wherein the support structure (9) is configured to provide a temporary repository (10) arranged to be movable to a position relative to the effector (4) which is reachable by the effector (4) for any possible elevation of the lifter (6) to which the effector (4) is mounted.

2. The service robot according to claim 1, wherein the service robot (1) comprises at least one sensor (11) attached to the effector (4) for sensing a detail of a scene and one additional sensor (12) sensing the scene.

3. The service robot according to claim 1, wherein the robot's effector (4) comprises a gripping tool and a mechanical and/or an electrical interface for mounting and controlling at least one assistance tool.

4. A service robot system, comprising a robot, wherein the robot (1) having a drive system (3) for moving the robot (1) to target positions and at least one effector (4) for manipulating the robot's environment, wherein the service robot system comprises a processing unit (14) including a task determination unit for determining a task to be executed by the robot and configured to control the drive system (3) and the at least one effector (4) according to the task based on action definitions, wherein the processing unit (14) is configured to automatically retrieve action definition candidates from a database (17), evaluate the retrieved action definition candidates with respect to a success score indicating a likelihood that an action according to an action definition candidate contributes to successfully fulfilling the task, to execute actions according to action definition candidates of the retrieved action definition candidates having highest success score equal to or above a predefined threshold until an action to be executed next with a success score below the predefined threshold is reached, and to send a request for assistance via a communication interface (21) then.

5. The service robot system according to claim 4, wherein the processing unit (14) is configured to determine the success score for an action definition candidate based on information on success of an operation of an action according to a respective action definition candidate in a past.

6. The service robot system according to claim 4, wherein the processing unit (14) is configured to segment the task into a sequence of action definitions.

7. The service robot system according to claim 4, wherein the robot (1) is configured to execute the action according to the action definition candidate of the retrieved action definition candidates that has the success score equal to or above the predefined threshold only if a complete execution is possible.

8. The service robot system according to claim 4, wherein the processing unit (14) is configured to dynamically predict potential changes of the environment and to adapt actions, or select actions.

9. The service robot system according to claim 4, further comprising an operator interface (18, 19, 20) for remotely controlling the robot (1) to execute an action and/or input information for enhancing the database (17) by the operator interface in response to the request for assistance.

10. The service robot system according to claim 9, wherein a definition of the action that is executed based on a remote controlled operation is stored in the database (17) as a new action definition.

11. The service robot system according to claim 9, wherein the operator interface (18, 19, 20) comprises an extended reality (XR) set (20) including a headset and controls for virtually controlling the robot (1) to execute an operation before transmitting remote control signals to the robot (1) for executing an action accordingly.

12. The service robot system according to claim 4, wherein the robot (1) is equipped with at least one sensor (11, 12) for physically sensing the robot's environment, and is configured to transmit output of the sensor to the processing unit (14) and/or an operator interface (18, 19, 20).

13. A service robot system, comprising a robot, wherein the robot (1) having a drive system (3) for moving the robot (1) to target positions and at least one effector (4) for manipulating the robot's environment, wherein the service robot system comprises a processing unit (14) including a task determination unit for determining a task to be executed by the robot and configured to control the drive system (3) and the at least one effector (4) according to the task based on action definitions, wherein the processing unit (14) is configured to automatically retrieve action definition candidates from a database (17), evaluate the retrieved action definition candidates with respect to a success score indicating a likelihood that an action according to an action definition candidate contributes to successfully fulfilling the task, to execute an action according to an action definition candidate of the retrieved action definition candidates having highest success score equal to or above a predefined threshold, and to send a request for assistance via a communication interface (21) if the success score is less than a preset threshold, wherein the threshold for the success score is set individually for an action to be executed depending on one or more tags of one or more object involved in the action to be executed.

14. A method for improving autonomous execution of tasks of a service robot comprising following steps:

sensing environment (S1) of the service robot (1) with at least one sensor (11, 12);

determining one or more objects (S2) in the service robot's environment and associating a recognition certainty with each determined object;

determining a task (S3) to be executed by the service robot (1);

retrieving action definition candidates (S5) from a database (17);

evaluating the retrieved action definitions candidates (S6) with respect to a success score indicating a likelihood that an action according to an action definition candidate contributes to successfully fulfilling the task; and executing actions according to action definition candidates of the retrieved action definition candidates (S8) having highest success score equal to or above a preset threshold until an action to be executed next with a success score below the preset threshold is reached and to send a request for external assistance via a communication interface then.

15. The method according to claim 14, wherein the success score for an action definition candidate is calculated based on information on success of an operation of an action according to a respective action definition candidate in a past.

16. The method according to claim 14, wherein the task is segmented (S4) into a plurality of actions to be executed sequentially and/or in parallel, and for each action definition candidates are retrieved (S5).

17. The method according to claim 14, wherein the request includes at least one action definition candidate.

18. The method according to claim 14, wherein the service robot (1) is controlled remotely and/or information input by an operator interface is stored in the database (17) in response to the request.

19. The method according to claim 18, wherein a new action definition is created from remote operation of the service robot (1) and is added to the database (17).

20. The method according to claim 18, wherein determination of the task to be executed is based on an association of previously received instructions and context information, extracted from an encountered situation in a past that is similar to the current situation.

21. The method according to claim 14, wherein information on an entity involved in an action to be executed is read in in response to the request and added to a tag or added as additional tag for the entity.

22. The method according to claim 14, wherein the task to be executed is determined (S3) from an instruction received via an operator interface or determined from a current situation encountered by the service robot (1).

23. A method for improving autonomous execution of tasks of a service robot comprising following steps:

sensing environment (S1) of the service robot (1) with at least one sensor (11, 12);

determining one or more objects (S2) in the service robot's environment and associating a recognition certainty with each determined object;

determining a task (S3) to be executed by the service robot (1);

retrieving action definition candidates (S5) from a database (17);

evaluating the retrieved action definitions candidates (S6) with respect to a success score indicating a likelihood that an action according to an action definition candidate contributes to successfully fulfilling the task; and executing an action according to an action definition candidate of the retrieved action definition candidates (S8) having highest success score equal to or above a preset threshold and to send a request for external assistance via a communication interface if probability of action definition with the highest success score is below the preset threshold, wherein the threshold for the success score is set individually for an action to be executed depending on one or more tags of one or more object involved in the action to be executed.

* * * * *